(12) United States Patent
Costello et al.

(10) Patent No.: US 11,301,349 B2
(45) Date of Patent: Apr. 12, 2022

(54) METHOD AND PROCESS OF CYBER SECURITY VIA SOFTWARE IMAGING

(71) Applicants: Rolls-Royce Corporation, Indianapolis, IN (US); Rolls-Royce North American Technologies Inc., Indianapolis, IN (US)

(72) Inventors: John Joseph Costello, Indianapolis, IN (US); Richard Joseph Skertic, Carmel, IN (US)

(73) Assignees: ROLLS-ROYCE CORPORATION, Indianapolis, IN (US); ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 682 days.

(21) Appl. No.: 16/057,554

(22) Filed: Aug. 7, 2018

(65) Prior Publication Data

US 2020/0050754 A1    Feb. 13, 2020

(51) Int. Cl.
*G06F 21/00*      (2013.01)
*G06F 11/30*      (2006.01)
*G06F 8/61*       (2018.01)
*G06F 21/57*      (2013.01)

(52) U.S. Cl.
CPC ............ *G06F 11/3089* (2013.01); *G06F 8/63* (2013.01); *G06F 11/3037* (2013.01); *G06F 21/577* (2013.01)

(58) Field of Classification Search
CPC .... G06F 11/3089; G06F 8/63; G06F 11/3037; G06F 21/577; G06F 21/575; H04L 67/12; F02C 9/00
See application file for complete search history.

(56) References Cited

U.S. PATENT DOCUMENTS

2006/0229772 A1    10/2006  McClary
2013/0332025 A1    12/2013  Ziarno
(Continued)

OTHER PUBLICATIONS

Extended European Search Report, issued in European Application No. 19184849.8, dated Dec. 6, 2019, pp. 1-5, European Patent Office, Munich, Germany.

(Continued)

*Primary Examiner* — Kendall Dolly
(74) *Attorney, Agent, or Firm* — Crowell & Moring LLP

(57) ABSTRACT

Control systems and methods for securing software images to be executed by the control system. In some examples the control system includes a control node, a concentrator node, and a security module. The security module may include a secured memory area that can hold software images. The security module may load a first executable image from the secured memory area to the control node. The security module may also load a second executable image from the secured memory area to the concentrator node. In some examples, rather than having a security module load the software images, the control node and concentrator node each include a secured area of memory where their respective software images reside. Each of the control node and concentrator node may load the software images from their respective secured areas of memory.

16 Claims, 5 Drawing Sheets

(56) References Cited

U.S. PATENT DOCUMENTS

| | | | |
|---|---|---|---|
| 2013/0346700 A1* | 12/2013 | Tomlinson | G06F 9/526 |
| | | | 711/E12.07 |
| 2015/0363981 A1 | 12/2015 | Ziarno | |
| 2016/0065603 A1 | 3/2016 | Dekel | |
| 2017/0023918 A1* | 1/2017 | Frazer | G05B 19/0428 |
| 2018/0004536 A1* | 1/2018 | Scholten | H04L 9/3236 |
| 2018/0324204 A1* | 11/2018 | McClory | G06F 8/30 |
| 2019/0012921 A1* | 1/2019 | Pearson | G08G 5/003 |
| 2019/0036638 A1 | 1/2019 | Skertic | |
| 2019/0066018 A1* | 2/2019 | Sethi | G06Q 10/0633 |

OTHER PUBLICATIONS

European Search Report, dated Dec. 6, 2019, in EP Application No. 19184849.0.

\* cited by examiner

METHOD AND PROCESS OF CYBER SECURITY VIA SOFTWARE IMAGING

CROSS-REFERENCE TO RELATED APPLICATIONS

This application is related to concurrently filed U.S. patent application Ser. No. 16/057,546, entitled "A Method of Improved Cyber Security with Frequency Separation," filed Aug. 7, 2018, inventors: John Joseph Costello and Richard J. Skertic; U.S. patent application Ser. No. 16/057,526, entitled "Distributed Control and Monitoring System for Multiple Platforms," filed Aug. 7, 2018, inventors: Nathan Bingham, Michael T. Elliott, James McPherson, Chris Ruff, Andrew Terbrock and Kerry Wiegand; U.S. patent application Ser. No. 16/057,529, entitled "Distributed Control and Monitoring System for Multiple Platforms," filed Aug. 7, 2018, inventors: Nathan Bingham, Michael T. Elliott, James McPherson, Chris Ruff, Andrew Terbrock and Kerry Wiegand; U.S. patent application Ser. No. 16/057,535, entitled "Distributed Control and Monitoring System for Multiple Platforms," filed Aug. 7, 2018, inventors: Nathan Bingham, Michael T. Elliott, James McPherson, Chris Ruff, Andrew Terbrock and Kerry Wiegand; and U.S. patent application Ser. No. 16/057,542, entitled "Distributed Control and Monitoring System for Multiple Platforms," filed Aug. 7, 2018, inventors: Nathan Bingham, Michael T. Elliott, James McPherson, Chris Ruff, Andrew Terbrock and Kerry Wiegand. The entirety of these applications are herein incorporated by reference.

BACKGROUND

Aircrafts, such as commercial and military aircraft, include aerospace control systems that control and monitor aircraft engines. The aerospace control systems may control and/or monitor aerospace control system components such as, for example, aircraft engine pressure sensors, temperature sensors, solenoids, and actuators. The aerospace control systems may also control and/or manage other aircraft engine parts and/or functionality. For example, aerospace control systems may assist in ensuring optimum aircraft engine efficiencies during flight are achieved by receiving various flight condition information and controlling various aircraft engine operations, such as fuel flow, valve positions, and others. Aerospace control systems may include a full authority digital engine controller ("FADEC") that includes an electronic engine controller ("EEC") or engine control unit ("ECU"). The FADEC may further include a central processing unit ("CPU"), memory, and a data bus to communicate with other aircraft engine components, such as aircraft engine sensors and actuators. In addition, the FADEC may include maintenance ports and/or communication ports. These ports include connector interfaces for various connector types such as Ethernet ports, serial ports, and/or universal serial bus ("USB") ports, among others, that may connect with different parts of the aircraft.

Aerospace control systems may include a centralized (or federated) control system ("CCS") architecture design or a distributed control system ("DCS") architecture design. Aerospace control systems incorporating a CCS architecture design include a FADEC with a CPU that handles all processing functions. The FADEC also includes additional electronic circuitry required for data acquisition (such as from the various sensors) as well as signal conditioning. In addition, interface (e.g., wire) harnesses may be used to connect the various aerospace control system components, such as sensors and/or actuators to the FADEC.

An aerospace control system incorporating a DCS architecture design, however, do not require a FADEC with this additional circuitry. Instead, the various aerospace control system components (e.g., sensors and/or actuators) include local processing capabilities that can relay information to the FADEC's CPU. In addition, a DCS architecture design includes digital communication between the FADEC and the various sensors and/or actuators, rather than interface harnesses. Aerospace control systems with a DCS architecture design may also employ a data concentrator (e.g., concentrator node) that provides for communication with both components that do not include local processing capabilities as well as components that do include local processing capabilities. The data concentrator facilitates the communications between the FADEC and the nodes.

These aerospace architectures, however, have vulnerabilities during operation in a cyber-hostile environment. For example, threats from a cyber attack can come from software loaded onto the FADEC via one of the FADEC's maintenance or communication ports, for example. Threats may also come from hacking into access points over communication links between the FADEC and other parts of the aerospace control system, such as sensors and actuators. In addition, aerospace architectures are vulnerable to "hardware hacks," where hardware, such as the FADEC or a communication link, is physically altered to allow access to the aerospace control system. As such, there are opportunities to address these and other vulnerabilities with aerospace control systems.

SUMMARY

According to some aspects of the present disclosure, a control system for an aircraft engine includes a control node and a concentrator node. The control node includes a first processor and a first memory, and the concentrator node includes a second processor and a second memory. The control node is operably coupled to the concentrator node. The control system further includes a security module operably coupled to the control node and the concentrator node, where the security module is configured to load a first executable image to the first memory for execution by the first processor, and load a second executable image to the second memory for execution by the second processor.

In some examples, a control system for an aircraft engine includes a control node comprising a first processor, a first memory, and a first security module. The first security module is configured to load a first executable image to the first memory for execution by the first processor. The control system also includes a concentrator node comprising a second processor, a second memory, and a second security module, where the concentrator node is operably coupled to the control node. The second security module is configured to load a second executable image to the second memory for execution by the second processor.

In some examples, a method for controlling an aircraft engine includes loading, by a security module operably coupled to a control node and a concentrator node, a first executable image from a secured memory to a memory of the control node for execution by a processor of the control node. The method may also include loading, by the security module, a second executable image from the secured memory to a memory of the concentrator node for execution by a processor of the concentrator node.

In some examples, a non-transitory computer-readable medium includes instructions that, when executed by one or more processors, cause the one or more processors to load a first executable image from a secured memory to a memory of a control node for execution by a processor of the control node. The instructions, when executed by the one or more processors, may also cause the one or more processors to load a second executable image from the secured memory to a memory of a concentrator node for execution by a processor of the concentrator node.

BRIEF DESCRIPTION OF THE DRAWINGS

The following will be apparent from elements of the figures, which are provided for illustrative purposes.

Figure 1:
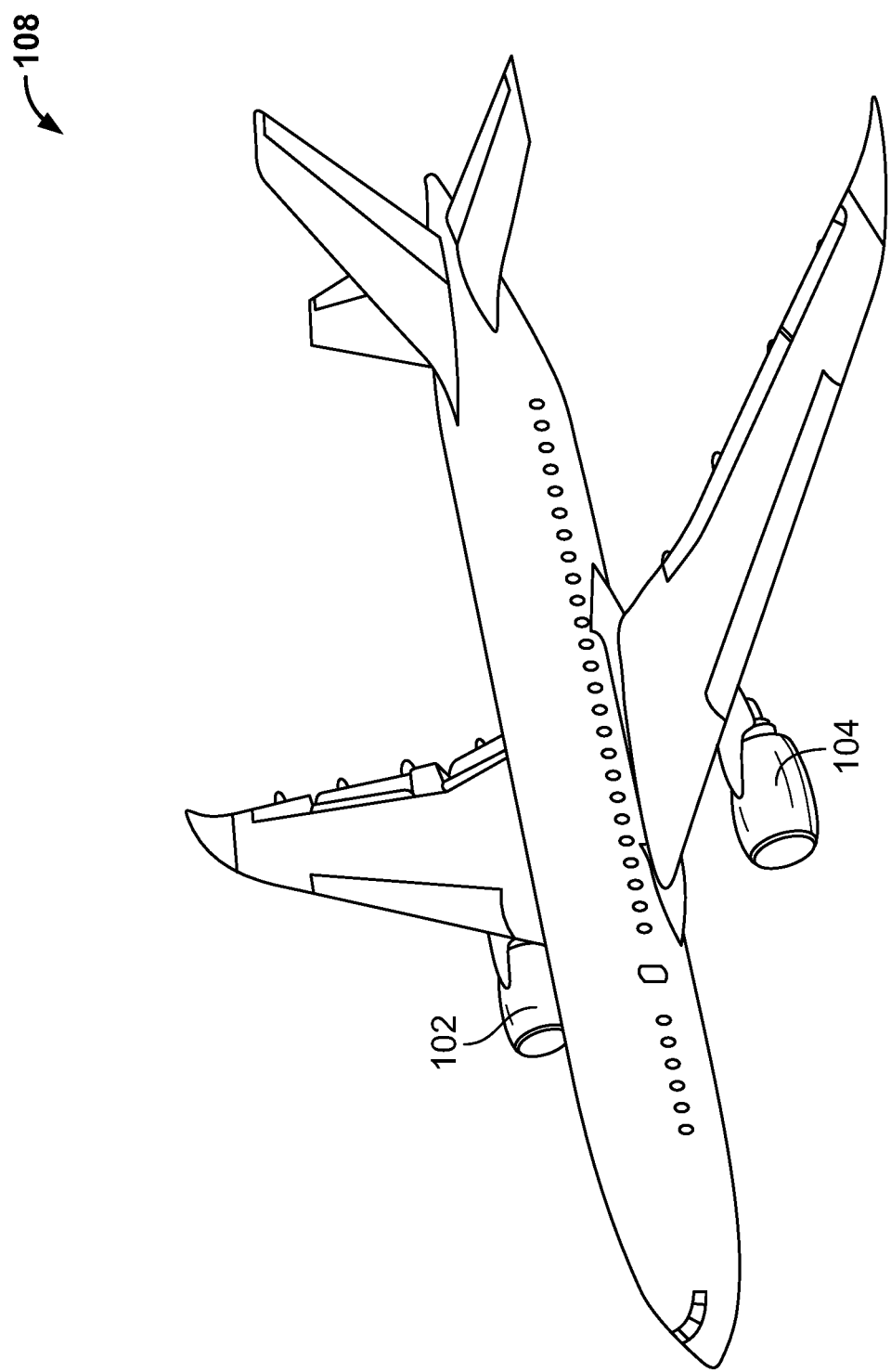
FIG. 1 is an illustration of an aircraft with engines employing an engine control system in accordance with some embodiments.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments in the drawings and specific language will be used to describe the same.

FIG. 1 illustrates an example aircraft 100 with turbine engines 102, 104. Each turbine engine may be controlled by an engine control system, which is discussed in more detail with respect to FIG. 2.

Figure 2:
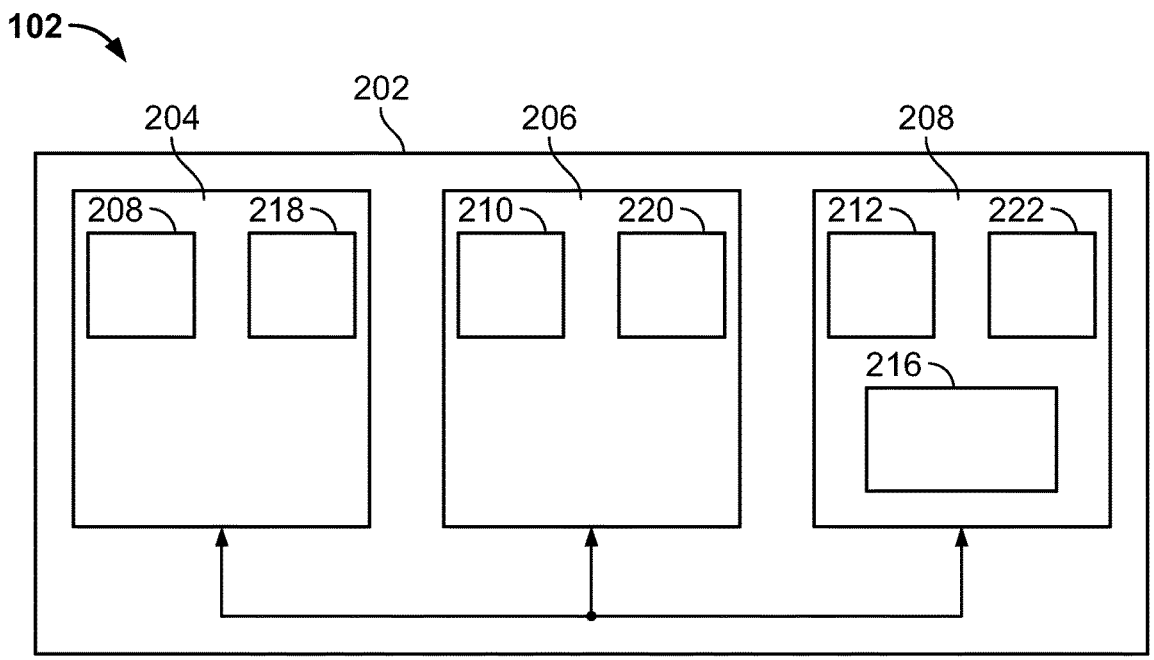
FIG. 2 is an illustration of an aircraft engine employing an engine control system in accordance with some embodiments.
Figure 2:
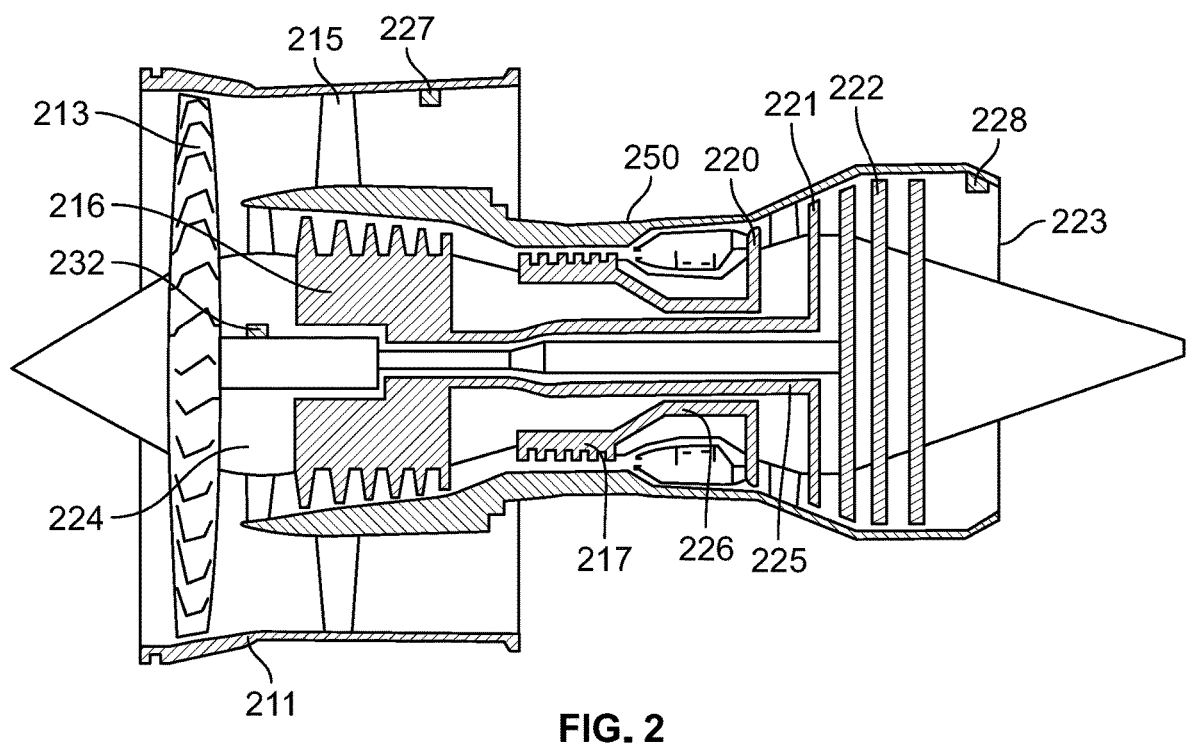

FIG. 2 illustrates the aircraft engine 102 of the example aircraft 100 of FIG. 1 in more detail. The aircraft engine 102 includes an engine control system 202 that includes a control node 204, a concentrator node 206, and an electronic security module (ESM) 208. The control node may be, for example, a FADEC. In some examples, ESM 208 may be a hardware security module (HSM) or a trusted protection module (TSM). Each of the control node 204, concentrator node 206, and ESM 208 may include one or more processing units 210, 212, 214. A processing unit can be, for example, a microprocessor, an execution unit or "core" on a microprocessor chip, a digital signal processor (DSP), a soft or hard core within a field-programmable gate arrays (FPGA), a processor within an application-specific integrated circuit (ASIC), a general processing unit (GPU), a commercial off the shelf (COTS) processor, or any other suitable processor. For example, the ESM 208 may include a secure crypto-processor chip, or may use a combination of integrated circuits to make itself more tamper resistant. In addition to the crypto-processors, ESM 208 may be certified to international standards and the designs may use different electronics, algorithms and encryption techniques to provide a level of security for the device's memory.

ESM 208 may also include an instruction memory 216. Instruction memory 216 can store instructions that can be accessed (e.g., read) and executed by processing unit 214. For example, instruction memory 214 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Instruction memory 216 may also store data and instructions that may not be executed by processing unit 214. For example, as described in more detail below, instruction memory 216 may store executable instructions (e.g., software image) that are configured to be loaded to one or both of control node 302 and concentrator node 304.

Each of the control node 204, concentrator node 206, and ESM 208 may also include working memory 218, 220, 222, respectively. Processing units 210, 212, 214 can store data to, and read data from, working memory 218, 220, 222, respectively. For example, processing unit 214 of the ESM 208 can store a working set of instructions to working memory 222, such as instructions loaded from instruction memory 216. Processing units 210, 212, 214 can use working memory 218, 220, 222, respectively, to store dynamic data.

ESM 208 may be commutatively coupled to control node 204 and concentrator node 206. Processing unit 214 of ESM 208 may be configured to provide instructions from instruction memory 216 to control node 204. For example, processing unit 214 may provide instructions from instruction memory 216 to working memory 218 of control node 204. Processing unit 210 may then execute the instructions from working memory 218.

Similarly, processing unit 214 may be configured to provide instructions from instruction memory 216 to concentrator node 206. For example, processing unit 214 may provide instructions from instruction memory 216 to working memory 220 of concentrator node 206. Processing unit 212 of concentrator node 206 may then execute the instructions from working memory 220. The instructions may be provided by processing unit 214 to control node 204 and concentrator node 206 as part of a power-up procedure, for example.

Figure 3:
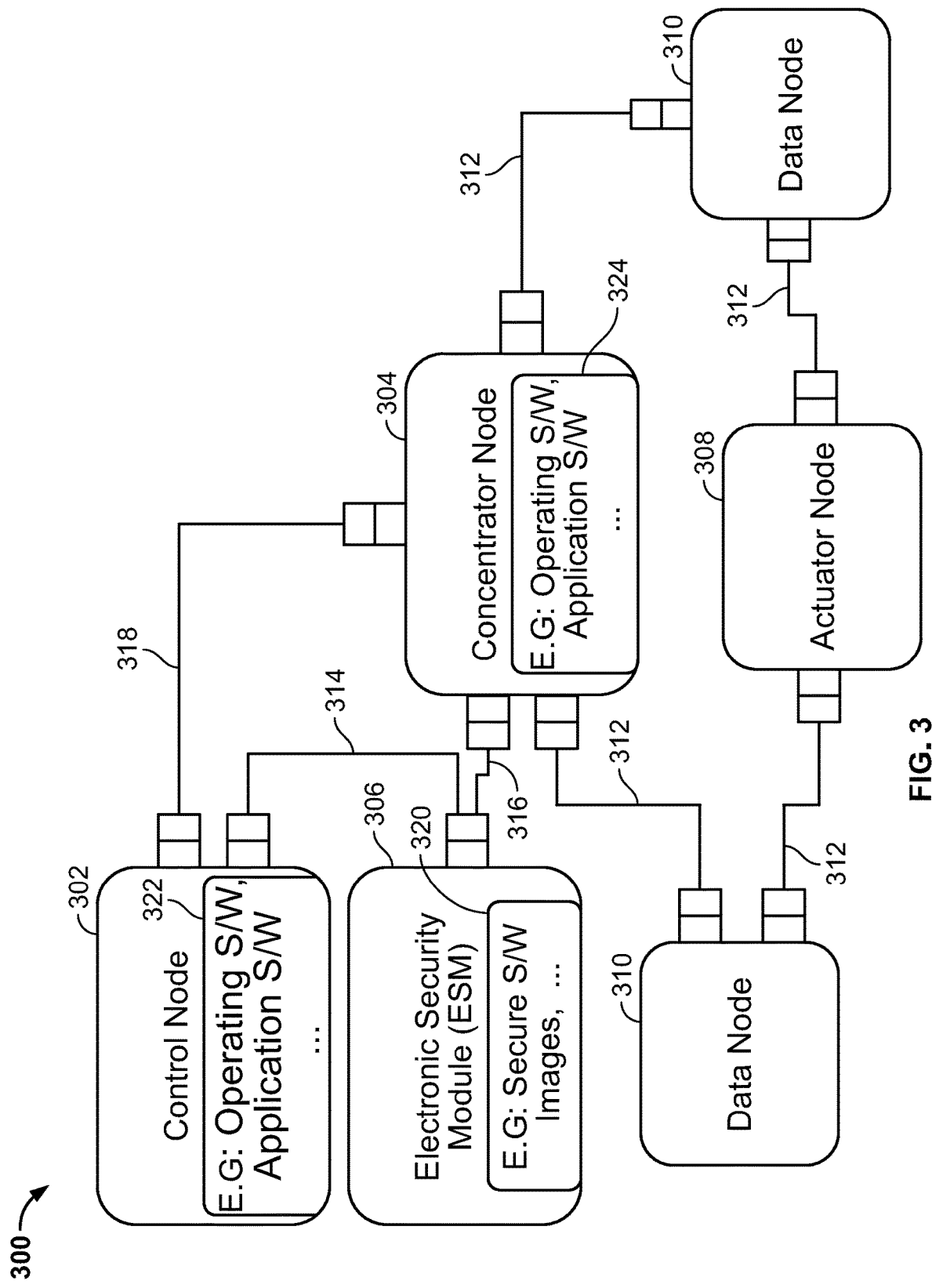
FIG. 3 is a block diagram of an engine control system in accordance with some embodiments.

FIG. 3 illustrates a block diagram of an engine control system 300 that includes a control node 302, a concentrator node 304, an ESM 306, one or more data nodes 310, and one or more actuators 308. Concentrator node 304 is communicatively coupled to each of one or more sensors 310 and one or more actuators 308 over communication link 312. For example, concentrator node 304 may communicate with each of one or more sensors 306 and one or more actuators 308 over communication link 312. Communication link 312 may be a fiber optic communication link, an Ethernet link, or any other suitable link.

Data node 310 may be, for example, a sensor such as an optical sensor, a pressure sensor, a temperature sensor, a smart sensor, or any other suitable sensor. Data node 310 may provide sensor readings over communication link 312 to concentrator node 306.

Concentrator node 304 is also communicatively coupled to control node 302 over at least a first communication link 318. First communication link 318 may be a fiber optic link, such as one using multi-mode optical fiber (e.g., a multi-mode fiber optic link), a hardwired link such as an Ethernet link, or any other suitable link. Control node 302 is operable to transmit to, and receive data from, concentrator node 304 over first communication link 318. For example, concentrator node 304 may send sensor readings, such as from one or more data nodes 310, to control node 302 over first communication link 318. In addition, control node 302 may send control messages to concentrator node 304, such as control messages to control one or more actuators 308, over first communication link 318. In some examples, communications over first communication link 314 are encrypted.

ESM 306 is commutatively coupled to control node 302 over communication link 314. ESM 306 is also commutatively coupled to concentrator node 304 over communication link 316. Each of communication link 314 and communication link 316 may be, for example, a fiber optic link, any suitable hardwired link (e.g., an Ethernet link), or any other suitable link.

ESM 306 safeguards, manages, and secures software (e.g., a software image). For example, ESM may secure software images, such as those that include software drivers and applications. As shown in the figure, ESM 306 includes a secured memory 320. ESM 306 may store software in secured memory 320. In some examples, ESM 306 may be configured to encrypt software, and store the encrypted software in secured memory 320.

For example, secured memory 320 may store a software image (e.g., executable instructions) that may be executed by control node 302. ESM 306 is operable to write the software image to memory 322 of control node 302. Control node 302 may then execute the software image. Similarly, secured memory 320 may store a software image that may be executed by concentrator node 304. ESM 306 is operable to write the software image to memory 324 of concentrator node 304. Concentrator node 304 may then execute the software image.

As such, in this example the ESM 306 operates as a master node, while the control node 302 and the concentrator node 304 act as slave nodes. The ESM 306, acting as a master node, programs each of the slave nodes by writing software images into their respective memories for execution. Once written, the slave nodes may then execute the written software images. In some examples, ESM 306 programs the slave nodes at startup (e.g., power-up).

In some examples, ESM 306 is operable to first test memory 322 of control node 302 and memory 324 of concentrator node 304. For example, prior to writing a software image into memory 322, ESM 306 may perform a memory check (e.g., test) of memory 322. The memory check may be any test that checks memory's 322 integrity such as, for example, a walking ones test. In some examples, the memory test includes clearing the memory by first writing all ones, reading back all ones, then writing all zeros. If the memory check fails, ESM 306 may provide an error indication to a user, such as be turning on an error light (e.g., led). Otherwise, if the memory test passes, then ESM 306 goes forward with programming memory 322 with a software image. Similarly, ESM 306 may perform a memory check of memory 324 of concentrator node 304.

In some examples, the ESM 306 signals control node 302 when the software image is loaded to memory 322 of control node 302. The signal indicates to control node 302 that the software image has been loaded to memory 322 and is ready for execution. Similarly, in some examples, ESM 306 signals concentrator node 304 when a software image is loaded to memory 324 of concentrator node 304. The signal indicates to concentrator node 304 that the software image has been loaded to memory 324 and is ready for execution.

ESM 306 may signal control node 302 or concentrator node 304 in any suitable way. For example, ESM 306 may provide the signal by writing a specific location within memory 322 or memory 324. Upon the writing of the specific location, the respective node begins loading the software image into, for example, working memory for execution. As another example, each of respective communication links 314, 316 may include a reset signal (e.g., line) which, upon activation, holds control node 302 and concentrator node 304, respectively, in reset. For example, before loading a software image into memory 322, ESM 306 may hold control node 302 in reset via the reset signal. Upon completing the loading of the software image into memory 322, ESM 306 may "release" the reset signal, thus causing control node 302 to come out of reset and begin loading the software image for execution. In some examples, intra-module signalling can occur between ESM 306, and control node 302 and concentrator node 304, over traditional copper harnesses, fiber optic interfaces, or other electrical interconnecting networks. In addition to the hardware associated with the signalling, custom protocols or algorithms can be implemented as well for intra-module communications.

Among other advantages, ESM 306 secures software images from system vulnerabilities, such as from cyber-attacks. For example, because a software image that is to be executed by control node 302 is stored in the secure memory area 322 of ESM 306, the ability to edit or otherwise compromise the software image is made much more difficult, if not impossible.

In some embodiments, there is no ESM 306 in engine control system 300. Rather, the control node 302 and the concentrator node 304 program themselves, for example, at startup. In this example, each of the control node 302 and the concentrator node 304 include a secure area of memory, for example, similar to secured memory 320 of ESM 306. This example may have the benefit of eliminating any possible transmission errors from the ESM 306 to the control node 302 and the concentrator node 304. This method may also allow for faster programming, as there is no delay in transmitting software images from the ESM 306 to the control node 302 and the concentrator node 304.

Figure 4:
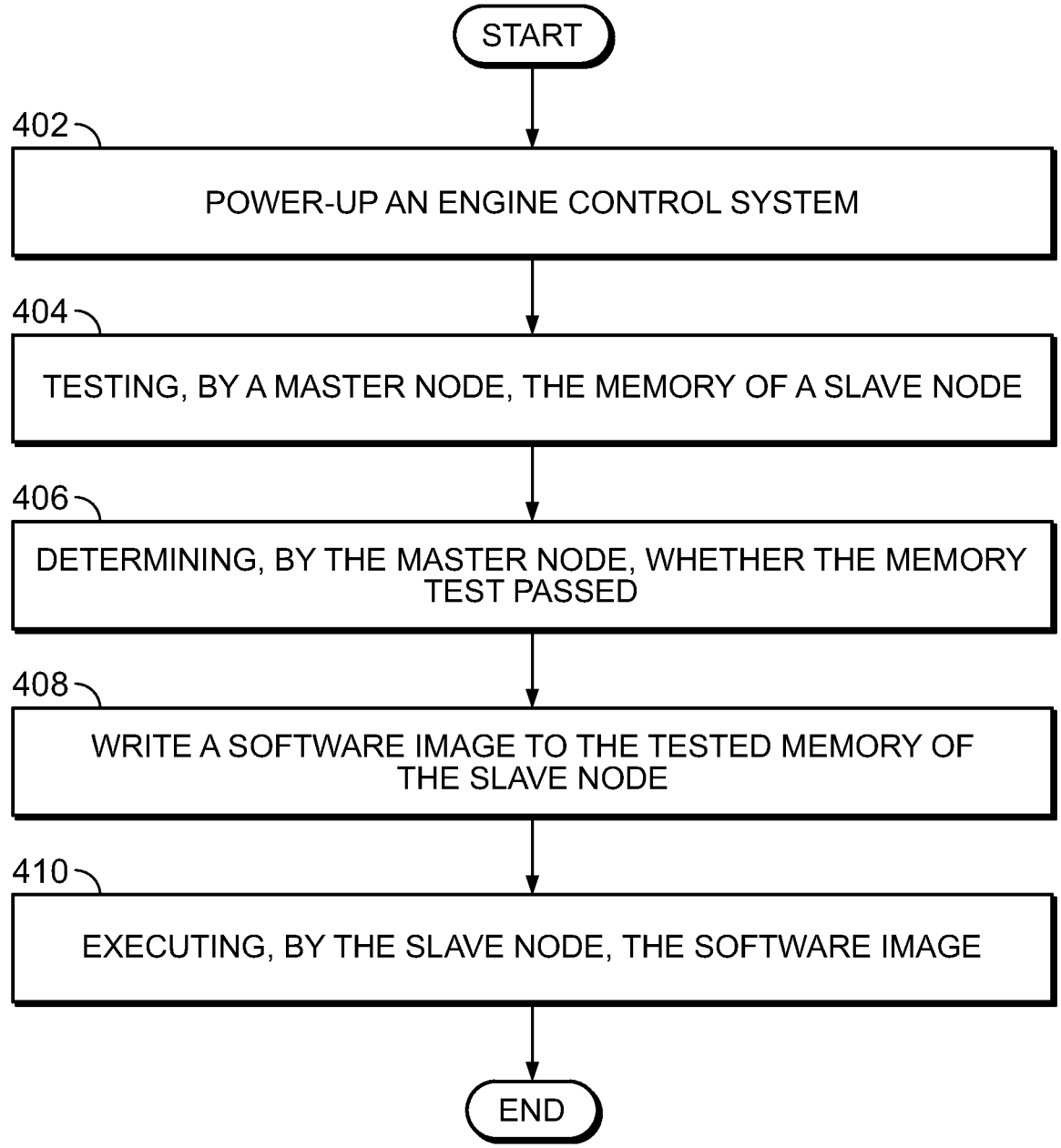
FIG. 4 is a flowchart of an example method that can be carried out by the engine control system of FIG. 3 in accordance with some embodiments.

FIG. 4 is a flowchart of an example method 400 that can be carried out by, for example, the engine control system 300 of FIG. 3. Although the methods are described with reference to illustrated flowcharts, it will be appreciated that many other ways of performing the acts associated with the methods may be used. For example, the order of some operations may be changed, and some of the operations described may be optional.

Turning to the method 400, at step 402 an engine control system is powered up. At step 404, a master node, such as ESM 306 of FIG. 3, tests the memory of a slave node, such as control node 302 or concentrator node 304 of FIG. 3. For example, the memory of the slave node may be cleared by writing all ones, reading back all ones, and then writing all zeros. At step 406, a determination is made as to whether the memory test passed. For example, a determination may be made as to whether the memory is clean (e.g., reads back as all zeros). If the memory test did not pass, the method proceeds back to step 404, where the memory check is performed again. Otherwise, the method proceeds to step 408. At step 408, a software image is written to the tested memory of the slave node. At step 410, the software image is executed by the slave node.

Figure 5:
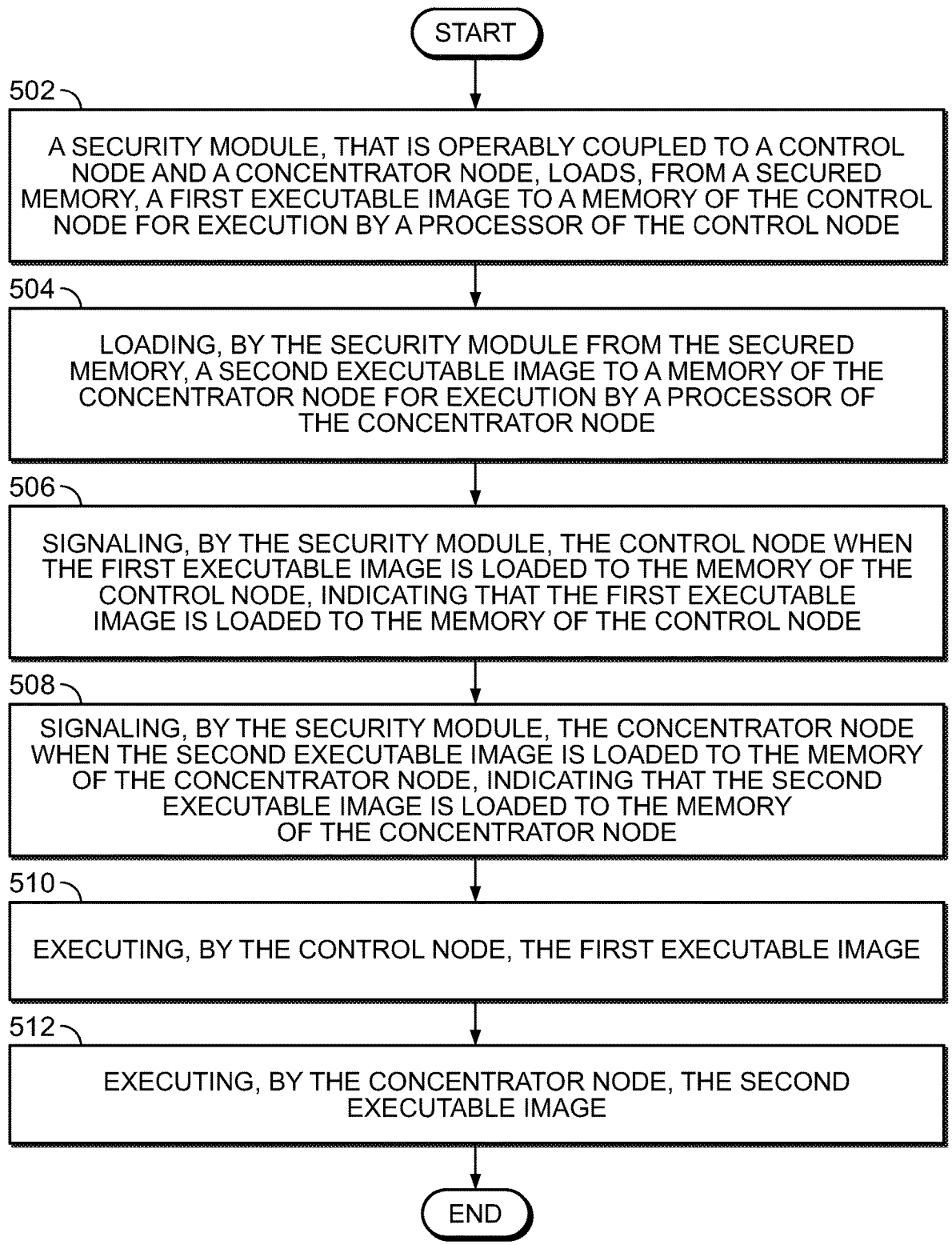
FIG. 5 is a flowchart of another example method that can be carried out by the engine control system of FIG. 3 in accordance with some embodiments.

FIG. 5 is a flowchart of another example method 500 that can be carried out by, for example, the engine control system 300 of FIG. 3. At step 502, a security module, that is operably coupled to a control node and a concentrator node, loads, from a secured memory, a first executable image to a memory of the control node for execution by a processor of the control node. At step 504 the security module loads, from the secured memory, a second executable image to a memory of the concentrator node for execution by a processor of the concentrator node. At step 506, the security module signals the control node when the first executable image is loaded to the memory of the control node, indicating that the first executable image is loaded to the memory of the control node. At step 508, the security module signals to the concentrator node when the second executable image is loaded to the memory of the concentrator node, indicating that the second executable image is loaded to the memory of the concentrator node. At step 510, the control node executes the first executable image. At step 512, the concentrator node executes the second executable image.

Although examples are illustrated and described herein, embodiments are nevertheless not limited to the details shown, since various modifications and structural changes may be made therein by those of ordinary skill within the scope and range of equivalents of the claims.

What is claimed is:

1. A control system for an aircraft engine comprising:
   a control node comprising a first processor and a first memory;
   a concentrator node comprising a second processor and a second memory, wherein the control node is operably coupled to the concentrator node;
   a security module operably coupled to the control node over a first communication link and the concentrator node over a second communication link, wherein the security module is configured to load a first executable image over the first communication link to the first memory of the control node for execution by the first processor, and load a second executable image over the second communication link to the second memory of the concentrator node for execution by the second processor;
   signal to the control node when the first executable image is loaded to the first memory via the first communication link that the first executable image is loaded to the first memory; and
   signal to the concentrator node when the second executable image is loaded to the second memory via the second communication link that the second executable image is loaded to the second memory.

2. The control system of claim 1 wherein the security module is configured to load the first executable image to the first memory and load the second executable image to the second memory at power-up.

3. The control system of claim 1 wherein the security module is configured to:
   clear the first memory prior to the loading of the first executable image to the first memory; and
   clear the second memory prior to the loading of the second executable image to the second memory.

4. The control system of claim 1 wherein the first processor of the control node is configured to execute the first executable image upon its loading to the first memory, and wherein the control node is operable to communicate with the concentrator node in response to the execution of the first executable image by the first processor.

5. The control system of claim 1 further comprising at least one component operably coupled to the concentrator node, wherein the concentrator node is configured to communicate with the at least one component in response to the second executable image being loaded to the second memory.

6. The control system of claim 5 wherein the at least one component is a sensor, wherein the second processor of the concentrator node is configured to execute the second executable image after it is loaded to the second memory, and wherein the concentrator node is configured to receive sensor data in response to the second processor executing the second executable image.

7. The control system of claim 5 wherein the at least one component is an actuator, wherein the second processor of the concentrator node is configured to execute the second executable image after it is loaded to the second memory, and wherein the concentrator node is configured to control the actuator in response to the second processor executing the second executable image.

8. The control system of claim 1 wherein the first communication link is a first fiber optic link, and the second communication link is a second fiber optic link, and wherein the security module is configured to load the first executable image to the first memory over the first fiber optic link, and load the second executable image to the second memory over the second fiber optic link.

9. A method for controlling an aircraft engine, comprising:
   loading, by a security module operably coupled to a control node and a concentrator node, a first executable image from a secured memory over a first communication link to a memory of the control node for execution by a processor of the control node;
   loading, by the security module, a second executable image from the secured memory over a second communication link to a memory of the concentrator node for execution by a processor of the concentrator node; and
   signaling, by the security module to the control node, when the first executable image is loaded to the memory of the control node, indicating that the first executable image is loaded to the memory of the control node; and
   signaling, by the security module to the concentrator node, when the second executable image is loaded to the memory of the concentrator node, indicating that the second executable image is loaded to the memory of the concentrator node.

10. The method of claim 9 further comprising:
    clearing the memory of the control node prior to the loading of the first executable image; and
    clearing the memory of the concentrator node prior to the loading of the second executable image.

11. The method of claim 10 wherein clearing the memory of the control node and the concentrator node each comprise:
    setting each memory location of the memory to a first value;
    setting each of the memory locations of the memory to a second value;
    reading each of the memory locations of the memory; and
    determining whether each read value matches the second value, wherein the loading of the first executable image and the second executable image is based on determining that each read value matches the second value.

12. A control system for an aircraft engine comprising:
a control node comprising a first processor and a first memory, the control node being a full authority digital engine controller (FADEC);
a concentrator node comprising a second processor and a second memory wherein the concentrator node is communicatively coupled to the FADEC, wherein the concentrator node is configured to communicate with a sensor, an actuator, or a combination thereof, and wherein the FADEC is configured to transmit to and receive data from the concentrator node;
a security module including a hardware security module (HSM) or a trusted protection module (TSM);
a first communication link between the security module and the FADEC; and
a second communication link between the security module and the concentrator node, wherein the security module is configured to load a first executable image over the first communication link to the first memory of the FADEC for execution by the first processor of the FADEC, and load a second executable image over the second communication link to the second memory of the concentrator node for execution by the second processor of the concentrator node,
wherein the first processor of the FADEC is configured to execute the first executable image upon its loading to the first memory, and wherein the FADEC is operable to communicate with the concentrator node in response to the execution of the first executable image by the first processor, and
wherein the concentrator node is configured to communicate with the sensor, the actuator, or the combination thereof in response to the second executable image being loaded to the second memory.

13. The control system of claim 12 wherein the security module is configured to load the first executable image to the first memory at power-up, and wherein the security module is configured to load the second executable image to the second memory at power-up.

14. The control system of claim 12 wherein:
the first processor of the FADEC is configured to clear the first memory prior to the loading of the first executable image to the first memory; and
the second processor of the concentrator node is configured to clear the second memory prior to the loading of the second executable image to the second memory.

15. The control system of claim 12 wherein the concentrator node is configured to receive sensor data from the sensor in response to the second processor executing the second executable image.

16. The control system of claim 12, wherein the second processor of the concentrator node is configured to execute the second executable image after it is loaded to the second memory, and wherein the concentrator node is configured to control the actuator in response to the second processor executing the second executable image.

* * * * *